United States Patent [19]

Utevski et al.

[11] Patent Number: 5,430,106

[45] Date of Patent: Jul. 4, 1995

[54] METHOD OF IMPROVING THE SURFACE COMPATIBILITY OF POLYPROPYLENE AND ITS COMPOSITIONS AND ARTICLES OBTAINED THEREBY

[75] Inventors: Lev Utevski, Beer-Sheva; Moshe Muskatel, Yavne, both of Israel

[73] Assignee: Bromine Compounds Ltd., Beer-Sheva, Israel

[21] Appl. No.: 142,985

[22] Filed: Oct. 26, 1993

[30] Foreign Application Priority Data

Oct. 28, 1992 [IL] Israel ............................. 103573

[51] Int. Cl.⁶ ............................................. C08F 8/00
[52] U.S. Cl. ............................. 525/288; 528/491; 528/503
[58] Field of Search ............................ 525/288

[56] References Cited

U.S. PATENT DOCUMENTS

| | | | |
|---|---|---|---|
| 4,105,710 | 8/1978 | Thomas et al. | 525/288 |
| 5,216,059 | 6/1993 | Atwell et al. | 525/288 |
| 5,332,788 | 7/1994 | Yokoyama et al. | 525/250 |

FOREIGN PATENT DOCUMENTS 9113107 9/1991 WIPO.
9203486 3/1992 WIPO.

*Primary Examiner*—Bernard Lipman
*Attorney, Agent, or Firm*—Michael N. Meller

[57] ABSTRACT

A method of improving the surface compatibility properties of polypropylene comprises thermo-processing polypropylene together with at least one aromatic ring-polybrominated olefinic compound, in the absence of free radical initiators.

16 Claims, No Drawings

METHOD OF IMPROVING THE SURFACE COMPATIBILITY OF POLYPROPYLENE AND ITS COMPOSITIONS AND ARTICLES OBTAINED THEREBY

FIELD OF THE INVENTION

The present invention relates to the field of plastic materials. More particularly, the invention relates to the improvement of the surface properties of polypropylene.

BACKGROUND OF THE INVENTION

Polypropylene is a relatively low cost resin having many desirable properties. It is lightweight, has excellent chemical resistance, a high melting point, good stiffness to toughness balance and excellent dielectric properties. Being thermoplastic, it is readily adaptable to a wide variety of applications in food packaging, construction, electronics, fiber, recreation uses, etc. Nevertheless, it suffers from a number of drawbacks which derive from its surface and inter-surface properties, and limit its use and/or give rise to inferior products. Among its disadvantages is its difficulty in printing, painting and glueing.

Furthermore, because of the hydrophobic nature of PP, undesirable electric charges develop on its surface which limit the processing speed of filaments and fibers made therefrom. It is also difficult to metallize and its adhesion to reinforcing additives, such as glass fiber, is poor. This is particularly felt with molding resin grade, i.e. isotactic+syndiotactic, polypropylene (PP).

THE PRIOR ART

One specific example of the latter problems is in the dyeing of polypropylene fibers and textile fabrics. End-use performance has been unsatisfactory with respect to light-fastness of the dye, and its resistance to rub-off, laundering and dry-cleaning. To overcome this, it has been suggested to modify the surface of the resin by sulfonation, halogenation or phosphorylation (H. Mark, Encyclop. of Polym. Sci. and Tech., Vol. 9, p. 431). The reagents required are corrosive and make for ecological waste problems. Copolymerizations or grafting of compounds bearing dye-receptive polar groups, including acrylic esters, acrylonitrile, vinylpyridine and styrene, have been applied, but the results have not been completely successful (I. I. Rubin, ed., Handbook of Plastic Material and Technology, 1900, p. 446-447.)

Another proposed solution has been the admixing of small amounts of dye receptors, such as organometallic compounds in melt extrusion (H. Mark, ibid, Vol. 9, p. 431), but such compounds are, like those of nickel, suspect in regard to toxicity. The incorporation of pigments has also been applied, but this method is expensive, is limited in the colors which can be produced and the incorporated pigment impairs fiber properties.

In metallizing PP it is of great importance to establish a strong bond between the metal and the plastic, since their different coefficients of thermal expansion cause stress build-up and product deterioration on thermal cycling. For this purpose, it has been necessary to treat the surface by oxidation, chemical modification as described above for the fiber applications, or graft modification (H. Mark, ibid, Vol. 11, p. 616) using vinyl monomers in conjunction with peroxides. However, the latter treatment seriously deteriorates the PP (WO 92/03486).

Similarly, only partially successful methods have been applied to polypropylene surfaces for the purposes of adhesion (Kirk-Othmer, Encyclopedia of Chemical Technology, 3rd ed., Vol. 1, p. 498). The severity of the problem in this case is shown by the application of concentrated sulfuric acid-sodium dichromate solutions. Ecological problems with respect to the latter are well documented.

Another area where the surface adhesion properties of PP require improvement is that of the reinforcement of molded products with additives such as glass fibers. The bond between the hydrophobic polymer and the inorganic surface has a significant effect on the properties of the reinforced plastic.

A method for improving the sorption capacity of hydrophobic thermoplastic polymers, including PP, as a means to improve performance in some of the above applications, has been proposed in U.S. Pat. No. 4,066,387. In that patent, bromine (or another halogen) is absorbed into the polymer and subsequently reacted therein with a pervading reagent such as $NH_3$ to produce a gas as one of the reaction products. Again, serious ecological problems are encountered in this approach in the disposal of $NH_4Br$.

It should be noted that the above discussion applies primarily to isotactic PP. By contrast, atactic PP (APP), which is a by-product of isotactic PP of low viscosity by comparison, and ethylene copolymers with vinyl acetate (EVA) have been known for use as hot-melt sealants and adhesives (Kirk-Othmer, ibid; Vol. 20, p. 554). It has been recently proposed (U.S. Pat. No. 5,041,484) to modify APP with dibromostyrene by grafting the latter onto APP using free-radical initiators for the purpose of rendering such hot melt adhesives fire retardant (FR).

In a similar manner, it has been proposed to flame retard isotactic or syndiotactic PP by grafting ring brominated styrene monomers onto PP using free-radical initiators at elevated temperatures (WO 92/03486).

However, by grafting brominated styrene onto PP in this manner, the viscosity of the substrate is seriously decreased and other physico-mechanical properties are impaired. For instance, as will be illustrated with reference to Table I below (Formulation 7), the melt flow index is increased 14-fold, while the Izod Impact is only 7.7 J/m. WO 92/03486 also notes that physical strength properties are deteriorated by harsh conditions in the grafting process (p. 14, lines 13–16). By contrast, when the same PP is thermo-processed with ring brominated styrene monomers, as well as other aromatic ring polybrominated olefinic compounds, but in the total absence of free radical initiators, PP products are obtained which have unique surface properties, rendering them more sorptive and adhering to inorganic surfaces, and at the same time retaining considerably better physico-mechanical properties.

SUMMARY OF THE INVENTION

The method of improving the surface compatibility properties of polypropylene, according to the invention, comprises thermoprocessing at least one aromatic ring-polybrominated olefinic compound with polypropylene, in the absence of free radical initiators. In contradistinction to the prior art, no free radical initiators are used when carrying out the process of the invention.

The aromatic ring-polybrominated olefinic compound can be a compound selected from the many suitable compounds known in the art, and the skilled person will be able to select a suitable compound for this purpose. According to a preferred embodiment of the invention, the said aromatic ring-polybrominated olefinic compound is selected from among dibromostyrene (DBS), tribromostyrene (TBS), pentabromobenzylomonoacrylate (PBB-MA), and their mixtures with themselves and/or with tribromophenylmaleimide (TBPMI).

According to another preferred embodiment of the invention, the surface compatibility property to be improved is the adhesion to other substances, e.g., to materials such as printing and/or painting and/or dyeing materials, glues, metals, metal coatings, glass and the like.

The invention is also directed to polypropylene compositions having improved surface compatibility properties, which compositions have been obtained by thermo-processing polypropylene together with at least one aromatic ring-polybrominated olefinic compound, in the absence of free radical initiators.

As stated, according to a preferred embodiment of the invention, the aromatic ring-polybrominated olefinic compound is selected from among dibromostyrene (DBS), tribromostyrene (TBS), pentabromobenzylmonoacrylate (PBB-MA), and their mixtures with themselves and/or with tribromophenylmaleimide (TBPMI).

Also encompassed by the invention are coated polypropylene articles, comprising a polypropylene composition of the invention, and a non-polypropylene coating material.

According to a preferred embodiment of the invention the coating material of the article is selected from among printing and/or painting and/or dyeing materials, glues, metals, metal coatings, glass, and the like.

As stated, the compositions of the invention are produced by thermoprocessing. As used herein, the term "thermo-processing" is meant to include all the conventional mixing and forming operations used in processing PP. These include, for example, injection molding, cast molding, extrusion, vacuum forming, thermo-pressing, rotational molding, thermo-blending and foam formation at elevated temperatures. These can be combined with thermo-annealing. The temperature range of the thermo-processing operation is that used in conventional PP technology. Generally, temperatures of 100° C. to 280° C. are applied.

The time of exposure of the PP/aromatic ring-brominated olefinic compound mixture in the thermo-processing operation is also that applied in conventional PP technology, i.e. as short as one minute for, e.g., extrusion, two minutes for, e.g., thermo-pressing, and four minutes for, e.g., injection molding. The maximum time of exposure to the elevated temperatures will vary from minutes to even hours, depending not only on the thermoprocessing technique employed, but also on the type of equipment used, the mass and geometry of the product being formed, and whether or not thermo-annealing is also applied.

Other components conventionally used in PP compositions may be included. These comprise fillers such as glass fibers, pigments, UV and heat stabilizers, processing aids, FRs and FR synergists, e.g., antimony trioxide, anti-oxidants and lubricants, as well as impact modifiers (e.g., EPDM, EPR etc.)

The concentration of the aromatic ring-brominated olefinic compound vis-a-vis PP can be varied over a wide range, generally from 0.1% to 50% by weight, depending upon the specific application. Preferably, 1.0% to 30% is used.

DETAILED DESCRIPTION OF PREFERRED EMBODIMENTS

All the above and other characteristics and advantages of the invention will be better understood through the following illustrative and non-limitative examples.

EXAMPLE 1

Preparation of Formulations

The formulations in Table I were processed in a twin screw extruder (ex Brabender, PLE 651) at a temperature of 180°–200° C. Pellets received were injection-molded in an Arburg machine Type 221-75-350 at 230° C. Specimen bars of dimensions $\frac{3}{8}'' \times \frac{1}{2}'' \times 5''$ were thus prepared.

TABLE I

| Component | % (w/w) in Formulation | | | | | | | |
|---|---|---|---|---|---|---|---|---|
| | 1 | 2 | 3 | 4 | 5 | 6 | 7 | 8 |
| PP 50112 ex Amoco | 81.6 | 81.8 | 82.9 | 78.6 | 78.8 | 79.9 | 81.2 | 100 |
| TBS | 18.4 | 9.2 | 9.2 | 18.4 | 9.2 | 9.2 | 18.4 | — |
| PBB-MA | — | 9.0 | 2.3 | — | 9.0 | 2.3 | — | — |
| TBPMI FR-1033 | — | — | 5.6 | — | — | 5.6 | — | — |
| Dicumyl peroxide ex Polysciences Inc. | — | — | — | — | — | — | 0.4 | — |
| Antimony Trioxide ex Campine | — | — | — | 3.0 | 3.0 | 3.0 | — | — |
| Physical Properties | | | | | | | | |
| MFI 230° C./ 2.16 kg | 73.6 | 46.5 | 77.9 | 43.5 | | | 175 | 12.5 |
| Notched Izod Impact J/m | 22.7 | 21.7 | 21.6 | 22.3 | | | 7.7 | — |

Note: Formulation 7 exemplifies the composition of Example 4 in WO 92/03486. This can be seen to be a different material from Formulation 1.

EXAMPLE 2

Adhesion to Bronze

The specimens prepared in Example 1 were used in the adhesion test. In this test, bronze foil was cut to the dimension of 25×75×0.2 mm. Two such strips of bronze were placed one over the other with an overlapping area of 25×25 mm. Between the overlapping sections 0.1 g of the plastic formulations of Example 1 were placed. The systems were pressed in a Dake press at a temperature of 200° C. for five minutes at a pressure of 15 tons per $3\frac{5}{8}''$ ram diameter. The systems were cooled, and the pressure released. Using a Zwick 1435 tensile testing machine, the adhesion between the two bronze strips, imparted by the plastic formulation, was measured. The following results were recorded:

TABLE II

| | Formulation | | | | | | | |
|---|---|---|---|---|---|---|---|---|
| | 1 | 2 | 3 | 4 | 5 | 6 | 7 | 8 |
| Maximum Strength of Adhesion N/mm² | 2.76 | 1.67 | 1.15 | 2.10 | 2.63 | 1.48 | No Adhesion | |

EXAMPLE 3

Adhesion of Dye

Specimen bars of Formulations Nos. 2 and 3, as well as of pure PP 50112 ex Amoco were marked with a red felt pen (Artline 70, High Performance, Ex Shachihata, Japan). After five minutes, attempts were made to remove the markings by wiping briskly with a paper hand towel. The marking was easily removed in this manner from the bar of PP 50112, but not at all from those prepared from Formulations 2 and 3.

EXAMPLE 4

Adhesion of Gold Plating

Specimen bars of PP 50112 ex Amoco and of Formulation 3 were prepared as in Example 1 and cleaned with acetone before gold coating.

300 Å layers of gold were deposited on these bars by vapor deposition. Then, two (2.0) cm lengths were marked off on the plated surfaces and scored to penetrate the gold layer. Cellotape strips were pressed onto these 2.0 cm sections and then peeled off. Some of the gold was peeled off as well in each case.

The Cellotape strips bearing the gold thus removed were stuck onto blue lined semi-transparent millimeter graph paper. An ACS Chroma Sensor Model CS-3 Color Tester was then used to determine the relative amounts of gold adhering to the tapes in the following manner:

Six equidistant readings were recorded over the surfaces of the sections defined on the tapes. The Color Tester beam was 6 mm in diameter and the surfaces were 12×20 mm. The surface scanned was thus well represented by the six readings. Then a blank reading of the tape and graph paper alone was made, as was a maximum reading of a section of tape representing a section of PP from which essentially all the gold had been removed. By interpolation, it was seen that the bar prepared from Formulation 3 retained almost twice as much of the gold in comparison with that made from PP 50112 (36.3% vs. 19.7%).

The above examples have been given for the purpose of illustration and are not intended to constitute a limitation of the invention. From the examples given above it is easily seen that the compositions obtained according to the invention are different materials from those obtained in grafting processes involving radical initiation, and that they present substantially improved surface compatibility vis-a-vis polypropylene itself toward other substances. While the compositions and process of the invention have been described with reference to the examples and to preferred embodiments, it is clear that many different compositions can be prepared, without departing from the spirit of the invention or exceeding its scope.

We claim:

1. A method of improving the surface compatibility properties of polypropylene, comprising thermo-processing polypropylene together with at least one aromatic ring-polybrominated olefinic compound, in the absence of free radical initiators.

2. A method according to claim 1, wherein the aromatic ring-polybrominated olefinic compound is selected from the group consisting of dibromostyrene, tribromostyrene, pentabromobenzyl-monoacrylate, and mixtures thereof and, when required, additionally with tribromophenylmaleimide.

3. A method according to claim 1, further comprising adding at least one conventional plastic additive to the material being thermoprocessed.

4. A method according to claim 3, wherein the said conventional plastic additives comprise fillers, pigments, UV stabilizers heat stabilizers, processing aids, flame retardants, flame retardant synergists, antioxidants, lubricants and impact modifiers.

5. A method according to claim 4, wherein the flame retardant synergist is antimony trioxide.

6. A method according to claim 1, wherein the concentration of the aromatic ring-brominated olefinic compound vis-a-vis polypropylene is between 0.1% and 50% by weight.

7. A method according to claim 1, wherein the surface compatibility property to be improved is the adhesion to other substances.

8. A method according to claim 7, wherein the surface compatibility property to be improved is the adhesion to materials selected from among printing, painting, dyeing materials and combinations thereof, glues, metals, metal coatings, or glass.

9. A method according to claim 1, wherein the thermo-processing is carried out at a temperature between about 100° C. and 280° C.

10. A method according to claim 1, wherein the thermo-processing comprises a process selected from thermo-pressing, injection molding, cast molding, extrusion, vacuum-forming, rotational molding, thermo-blending and foam formation at elevated temperature, which may further be combined with thermo-annealing.

11. A method according to claim 1, wherein thermo-processing is carried out during a period of time of at least 1 minute.

12. A method according to claim 11, wherein the thermo-processing is carried out at a temperature between about 100° and 280° C.

13. A method according to claim 2, further comprising adding at least one conventional plastic additive to the material being thermo-processed.

14. A method according to claim 13, wherein said conventional plastic additives comprise fillers, pigments, UV stabilizers, heat stabilizers, processing aids, flame retardants, flame retardant synergists, antioxidants, lubricants and impact modifiers.

15. A method according to claim 2, wherein the concentration of aromatic ring-brominated olefinic compound vis-a-vis polypropylene is between 0.1% and 50% by weight.

16. A method according to claim 6, wherein the concentration of the aromatic ring-brominated olefinic compound vis-a-vis polypropylene is between 1% and 30% by weight.

* * * * *